Oct. 1, 1935.　　　A. F. W. RUSKE　　　2,015,872

BEARING

Filed April 28, 1934

INVENTOR.
ALBERT F. W. RUSKE
BY Munn, Anderson & Liddy
ATTORNEYS.

Patented Oct. 1, 1935

2,015,872

UNITED STATES PATENT OFFICE 2,015,872

BEARING

Albert F. W. Ruske, San Francisco, Calif.

Application April 28, 1934, Serial No. 722,994

7 Claims. (Cl. 308—211)

My invention relates to improvements in bearings, and it consists of the combinations, constructions and arrangements hereinafter described and claimed.

An object of my invention is to provide a bearing which is self-centering in that the roller bearings act upon conical sleeves and cause these sleeves to space themselves equal distances from the center of the bearing.

A further object of my invention is to provide a device of the type described which makes use of long and short roller bearings, and in this way the weight is distributed properly throughout the length of the bearing.

The device is extremely simple in construction and can be readily assembled and disassembled. The roller bearings can be quickly removed and new ones substituted for the worn-out ones. In this way the life of the bearing can be extended indefinitely.

Other objects and advantages will appear in the following specification, and the novel features of the device will be particularly pointed out in the appended claims.

My invention is illustrated in the accompanying drawing forming a part of this application, in which Figure 1 is a longitudinal section through the device, portions being shown in elevation;

Figure 1:
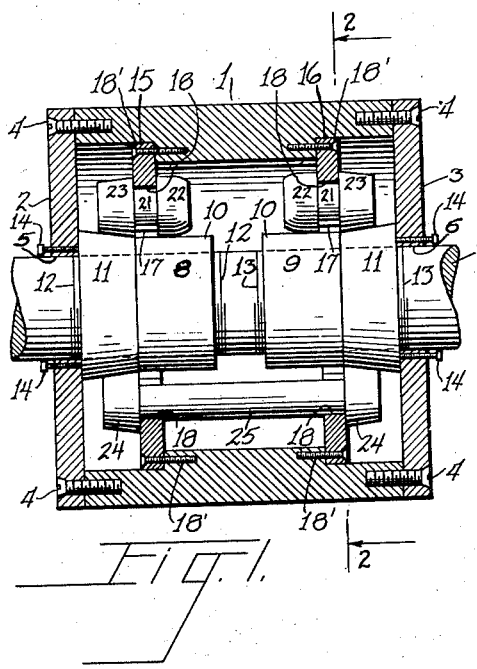

In carrying out my invention I provide a housing indicated generally at 1, and having end closure members 2 and 3 removably secured thereto by screws 4, or other suitable fastening means. The closure members 2 and 3 have central openings 5 and 6 for rotatably receiving a shaft 7. Conical-shaped sleeves 8 and 9 are threaded on the shaft 7 at 12 and 13, and have cylindrical portions 10 and conical-shaped portions 11. The closure members 2 and 3 bear against the adjacent ends of the sleeves 8 and 9 and hold them in the position shown in Figure 1. Screws 14 are carried by the ends 2 and 3 and hold the sleeves 8 and 9 in adjusted position. The sleeves 8 and 9 are rotated on the shaft 7 toward each other when taking up wear and the screws 14 are adjusted to contact with the sleeves and prevent an unscrewing action on the threaded portions 12 and 13.

Figure 2:
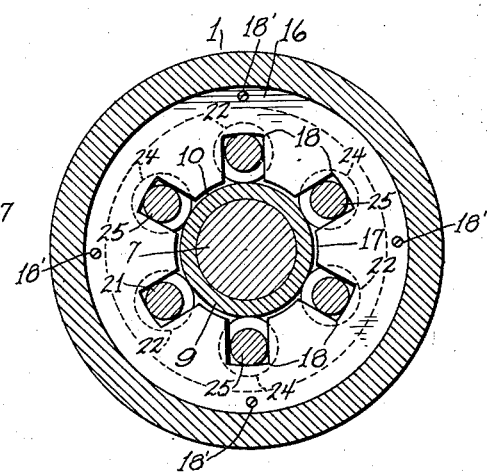
Figure 2 is a section along the line 2—2 of Figure 1.

In Figures 1 and 2 it will be noted that I provide partitions 15 and 16, and each partition has an opening 17 large enough to receive the sleeves 8 and 9. The opening 17 is provided with recesses 18. Figure 2 shows six recesses provided in each partition, although the number may be varied if desired. The partitions are secured to the casing 1 by screws 18'.

Figure 4:
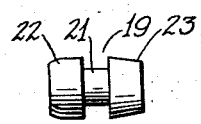
Figure 4 is a side elevation of one of the short roller bearings.
Figure 3:
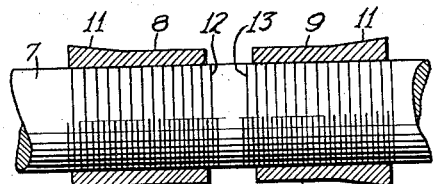
Figure 3 is a section through the conical-shaped members showing them mounted on the shaft.
Figure 5:
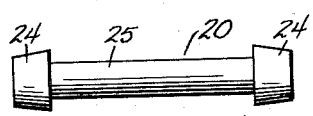
Figure 5 is a side elevation of one of the long roller bearings.

Referring to Figures 4 and 5, it will be noted that I provide short roller bearings 19 and long roller bearings 20. The short bearings 19 have a reduced portion 21 separating a cylindrical portion 22 and a conical-shaped portion 23. The partition 16 is provided with three of these short roller bearings and they are mounted in every other recess 18. In like manner the partition 15 is provided with three of the short roller bearings. Figure 1 shows how the short roller bearings are mounted in the partitions and illustrates how the partitions bear against the adjacent edges of the portions 22 and 23, so as to hold the short roller bearings against creeping in a longitudinal direction. The portions 22 have slightly rounded ends for a purpose hereinafter described.

I also provide long roller bearings 20 which have conical end portions 24. The central reduced section 25 of these long bearings extends between the two partitions 15 and 16 and the partitions bear against the adjacent edges of the end portions 24 in the manner shown in Figure 1. The conical portions 23 of the short bearings and the conical portions 24 of the long bearings ride on the conical portions 11 of the sleeves 8 and 9. This arrangement gives to the bearing a self-centering effect in that the forces exerted by the long and short bearings tend to move the sleeves 8 and 9 away from each other and the sleeves in turn bear against the screws 14 carried by the ends 2 and 3 so that the shaft 7 is held centrally with respect to the casing 1. This arrangement provides a bearing which will have a much longer life because the various parts are held against longitudinal play.

It will further be noted that the elongated bearings 20 have the effect of providing a fixed distance between the conical-shaped portions 11 of the sleeves 8 and 9. This arrangement further aids in keeping the sleeves in properly spaced relation with respect to the casing 1.

After an adjustment of the sleeves 8 and 9 on the shaft 7 has been made, the portions 23 of the short rollers 19 will be urged further away from the bearing center. The rollers will therefore have a tendency to fulcrum about the partitions 15 and 16 and to swing the portions 22 toward the axis of the bearing. The portions 22 are rounded at their ends to prevent the edges from biting into the sleeves 8 and 9 when the rollers are slightly swung.

If it is desired to remove any of the short or long bearings this can be readily done by first removing the ends 2 and 3, and then freeing the shaft 7 and the sleeves 8 and 9 from the housing 1. Any one of the rollers can now be moved toward the center of the bearing so as to free it from its recess and then the roller can be taken from the housing and a new one substituted in its place. The device is extremely simple in construction and is durable and efficient for the purpose intended.

Figure 6:
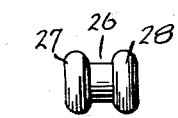
Figure 6 is a side view of a modified form.

A modified form of the short roller is shown in Figure 6. The roller 26 in this figure has two rounded ends 27 and 28 that are designed to ride on the sleeves 8 and 9 in the same manner as the short rollers 19.

While I have shown only the preferred forms of my invention, it should be understood that various changes or modifications may be made within the scope of the appended claims without departing from the spirit of the invention.

I claim:

1. A bearing comprising a housing, a shaft rotatably mounted in the housing, conical-shaped sleeves mounted on the shaft, flanges extending inwardly from the housing, and rollers carried by the flanges and bearing against the sleeves, certain of said rollers being longer than the others and being supported by more than one flange.

2. A bearing comprising a housing, a shaft rotatably mounted therein, conical-shaped sleeves mounted on the shaft, inwardly extending flanges carried by the housing, elongated rollers carried by more than one flange and having enlarged conical-shaped ends contacting with the flanges for preventing longitudinal movement of the rollers with respect to the housing, said rollers riding on the sleeves.

3. A bearing comprising a housing, a shaft rotatably mounted therein, conical-shaped sleeves mounted on the shaft, inwardly extending flanges carried by the housing, elongated rollers carried by more than one flange and having conical-shaped ends contacting with the flanges for preventing longitudinal movement of the rollers with respect to the housing, said rollers riding on the sleeves, and short rollers carried by each flange for bearing against the sleeves.

4. A bearing comprising a housing, a shaft rotatably mounted in the housing, sleeves threaded on the shaft and having cylindrical and conical-shaped portions, inwardly extending flanges carried by the housing, long rollers carried by more than one flange and having conical-shaped ends and bearing against the conical-shaped portions of the sleeves, and short rollers carried by each flange and having conical-shaped ends bearing against the conical-shaped portions of the sleeves and cylindrical ends bearing against the cylindrical portions of the sleeves.

5. A bearing comprising a housing, a shaft rotatably mounted in the housing, conical-shaped sleeves mounted on the shaft, end covers secured to the housing and bearing against the adjacent ends of the sleeves, and roller bearings having conical-shaped ends bearing against the sleeves for urging the sleeves against the covers whereby the sleeves are kept in proper position, and means carried by the end covers and contacting with the sleeves for preventing relative longitudinal movement between the shaft and the housing.

6. A bearing comprising a housing, a shaft rotatably mounted in the housing, conical-shaped sleeves mounted on the shaft, flanges extending inwardly from the housing, and rollers carried by the flanges and bearing against the sleeves, certain of said rollers being longer than the others and being supported by more than one flange, said sleeves being threaded on the shaft for adjustment toward each other to compensate for wear.

7. A bearing comprising a housing, a shaft rotatably mounted therein, conical-shaped sleeves mounted on the shaft, inwardly extending flanges carried by the housing, elongated rollers carried by more than one flange and having conical-shaped ends contacting with the flanges for preventing longitudinal movement of the rollers with respect to the housing, said rollers riding on the sleeves, and short rollers carried by each flange for bearing against the sleeves, said sleeves being threaded on the shaft for adjustment toward each other to compensate for wear.

ALBERT F. W. RUSKE.